(12) United States Patent
Hunt

(10) Patent No.: US 11,399,457 B2
(45) Date of Patent: Aug. 2, 2022

(54) CUTTING SYSTEM OF AN AGRICULTURAL MACHINE HEADER

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 209 days.

(21) Appl. No.: 16/690,484

(22) Filed: Nov. 21, 2019

(65) Prior Publication Data

US 2021/0153429 A1     May 27, 2021

(51) Int. Cl.
| | | |
|---|---|---|
| *A01D 34/14* | (2006.01) | |
| *A01D 41/14* | (2006.01) | |
| *A01D 34/30* | (2006.01) | |
| *A01D 34/18* | (2006.01) | |

(52) U.S. Cl.
CPC ........... *A01D 34/145* (2013.01); *A01D 34/18* (2013.01); *A01D 34/30* (2013.01); *A01D 41/142* (2013.01)

(58) Field of Classification Search
CPC ........ A01D 34/30; A01D 34/14; A01D 34/18; A01D 34/03; A01D 34/145; A01D 34/142
See application file for complete search history.

(56) References Cited

U.S. PATENT DOCUMENTS

| | | | | |
|---|---|---|---|---|
| 168,326 | A | * | 10/1875 | Denton ................... A01D 34/18 56/308 |
| 208,874 | A | * | 10/1878 | Wright .................... A01D 34/18 56/310 |
| 2,226,583 | A | * | 12/1940 | Ronning ................. A01D 34/18 56/308 |
| 3,066,468 | A | * | 12/1962 | Kowalik ............... A01D 34/145 56/301 |
| 3,431,714 | A | * | 3/1969 | Bouet .................... A01D 34/13 56/296 |
| 3,517,494 | A | * | 6/1970 | Beusink ................. A01D 34/30 56/293 |
| 4,530,204 | A | * | 7/1985 | Brooks .................. A01D 34/18 56/298 |
| 4,750,321 | A | * | 6/1988 | Klein ..................... A01D 34/18 56/298 |
| 5,123,237 | A | * | 6/1992 | Lutz ....................... A01D 34/18 56/298 |
| 5,732,539 | A | | 3/1998 | Loftus |
| 6,510,681 | B2 | * | 1/2003 | Yang ...................... A01D 34/13 56/296 |
| 6,962,040 | B2 | | 11/2005 | Talbot |
| 7,401,458 | B2 | | 7/2008 | Priepke |
| 9,027,316 | B2 | | 5/2015 | Dietrich |
| 9,113,593 | B2 | | 8/2015 | Talbot |
| 9,357,697 | B2 | | 6/2016 | Surmann et al. |

(Continued)

*Primary Examiner* — Abigail A Risic
(74) *Attorney, Agent, or Firm* — Peter Zacharias; Patrick Sheldrake

(57) ABSTRACT

A cutting system for a header of an agricultural machine includes a knife guard having a plurality of guards that are spaced apart by a guard pitch, and a knife section that is configured to move with respect to the knife guard for cutting crop material. The knife section includes a plurality of knives that are spaced apart by a knife pitch. The guard pitch is neither equal to nor is a whole number multiple of the knife pitch.

16 Claims, 4 Drawing Sheets

(56) References Cited

U.S. PATENT DOCUMENTS

| | | | |
|---|---|---|---|
| 10,765,060 B2* | 9/2020 | Schuler | A01D 34/04 |
| 2015/0305233 A1* | 10/2015 | Surmann | A01D 34/145 56/10.1 |
| 2016/0174460 A1 | 6/2016 | Honey et al. | |
| 2019/0053426 A1 | 2/2019 | Talbot | |
| 2020/0260641 A1* | 8/2020 | Schmidt | A01D 34/14 |
| 2021/0045288 A1* | 2/2021 | Sorensen | A01D 34/30 |
| 2021/0137002 A1* | 5/2021 | Dunn | A01D 34/30 |
| 2021/0144917 A1* | 5/2021 | Gurke | A01D 34/40 |

* cited by examiner

CUTTING SYSTEM OF AN AGRICULTURAL MACHINE HEADER

FIELD OF THE INVENTION

The present invention relates generally to a cutting system of a header of an agricultural cutting machine, such as a combine harvester, windrower or other crop harvesting machine.

BACKGROUND OF THE INVENTION

As is described in U.S. Pat. No. 7,401,458 to CNH America LLC, which is incorporated by reference herein in its entirety and for all purposes, sickles have been used to cut crop, including, but not limited to, hay, grasses, small grains and the like, for many years. Sickles typically include cutter bars supporting a row of knives. The knives mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly may move back and forth in a reciprocating movement or in a continuous motion (e.g., like a chainsaw), for example, to move the knives relative to the guards so that the leading knife edges of the knives cross over the guards or through slots in the guards. This produces a shearing or cutting action which severs plant stems and stalks or other material captured between the knives and the guards.

The knives simultaneously pass either over or through their respective guards to cut the crop. Simultaneously shearing the crop material at every guard results in pulse loading of the motor/transmission/gear box that moves the knife assembly, which causes non-optimal wear of the motor/transmission/gear box and uneven power consumption. Thus, it would be advantageous to either limit or avoid pulse loading of the knife assembly.

SUMMARY OF THE INVENTION

According to one aspect of the invention, a cutting system for a header of an agricultural machine includes a knife guard having a plurality of guards that are spaced apart by a guard pitch, and a knife section that is configured to move with respect to the knife guard for cutting crop material. The knife section includes a plurality of knives that are spaced apart by a knife pitch. The guard pitch is neither equal to nor is a whole number multiple of the knife pitch.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
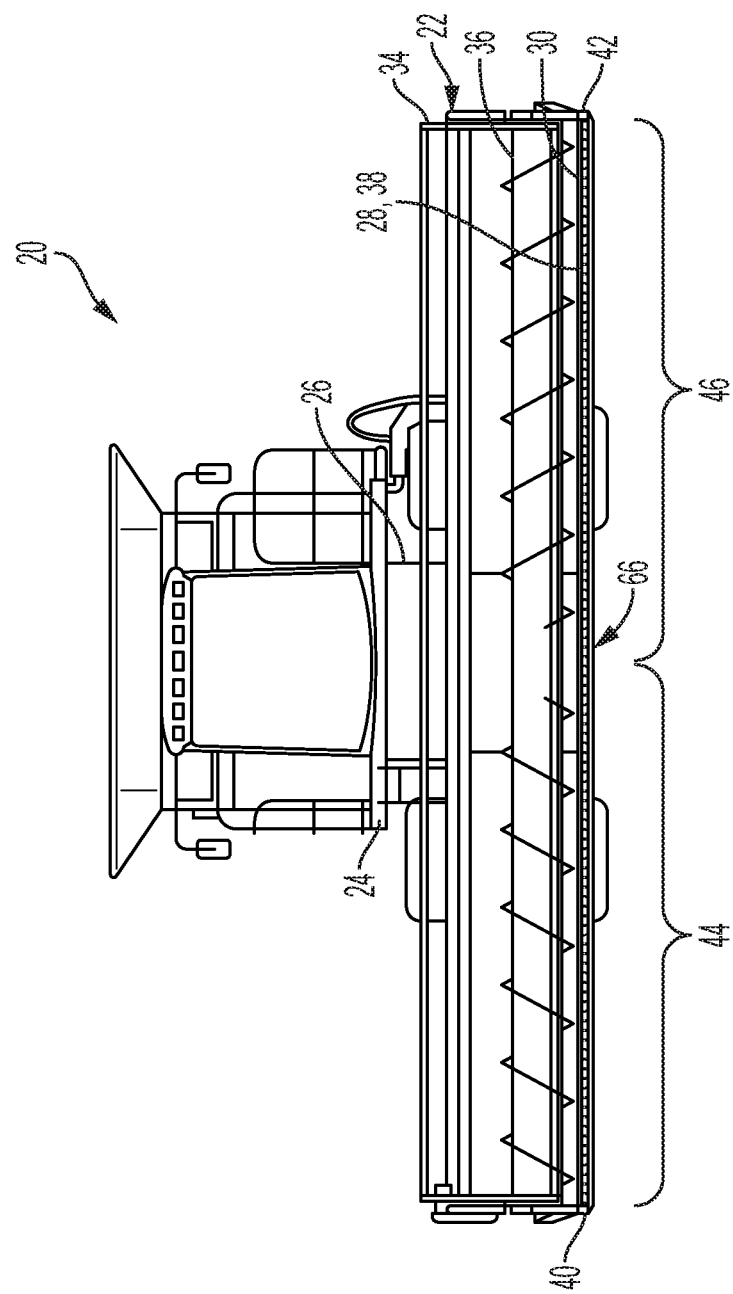
FIG. 1 is a forward end view of a combine including a header having a sickle drive mechanism.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

Figure 2:
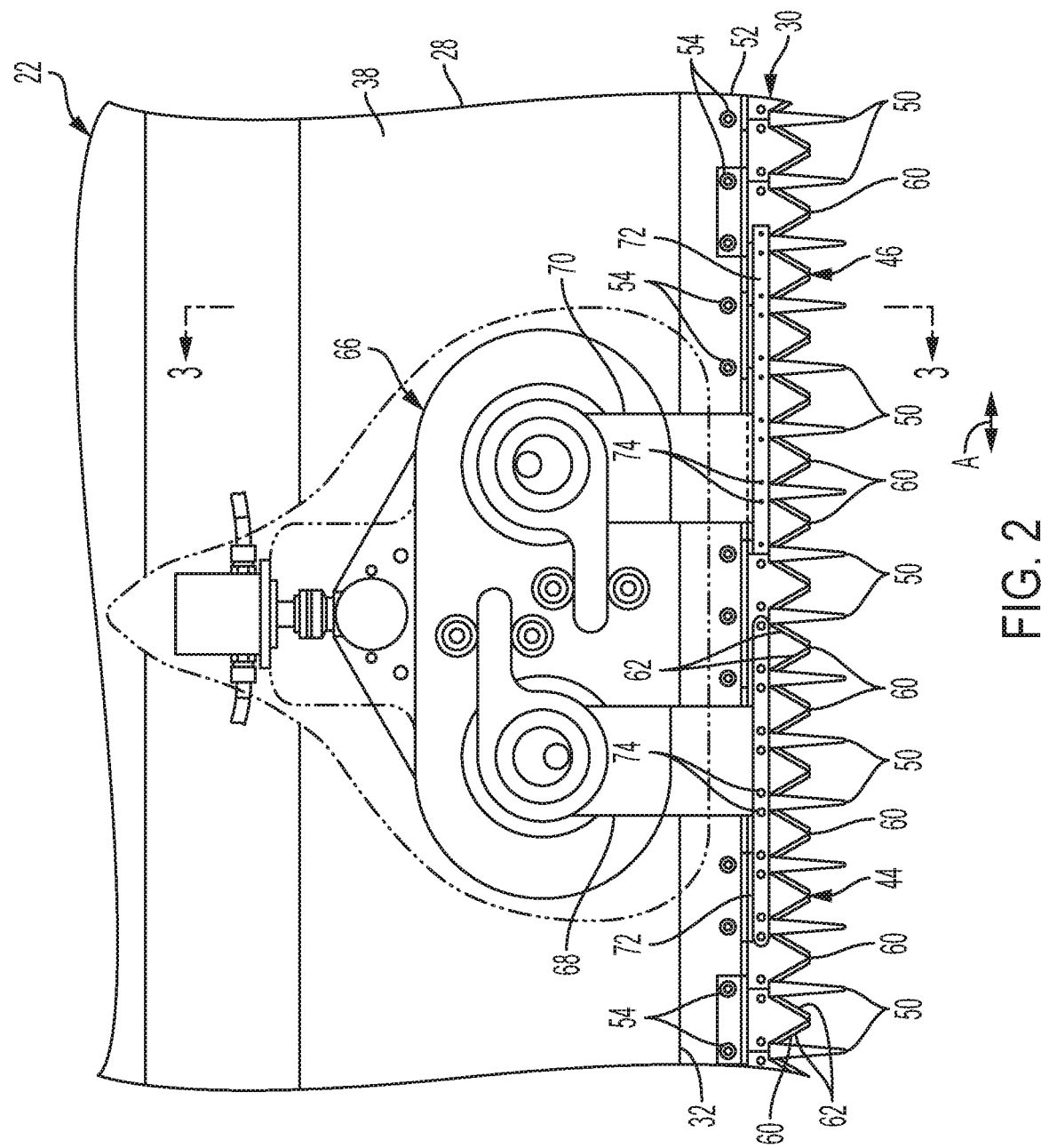
FIG. 2 is an enlarged fragmentary top view of the header of FIG. 1, with a cover and an upper bearing assembly removed to show other aspects of the sickle drive mechanism of FIG. 1.
Figure 3:
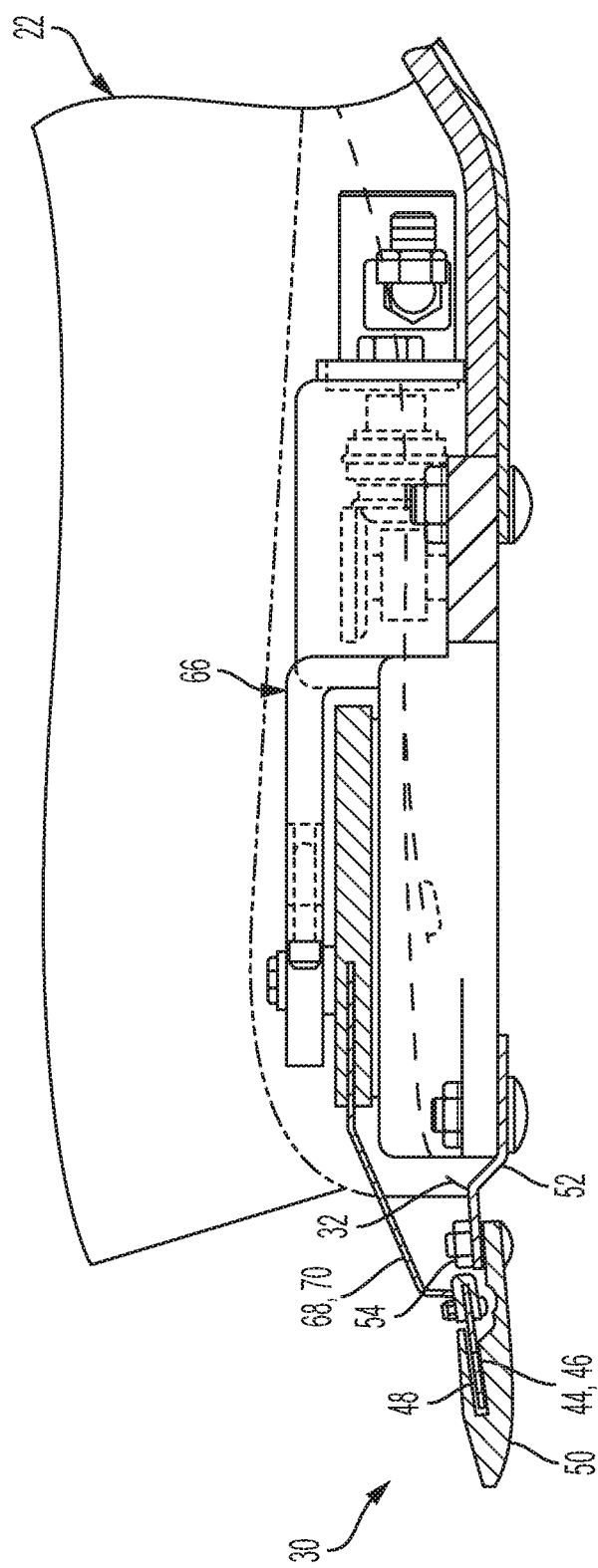
FIG. 3 is an enlarged fragmentary sectional view of the header taken generally along line 3-3 of FIG. 2, and with the cover and a floor of the header in phantom to reveal the sickle drive mechanism.

Referring now to the drawings, as is described in U.S. Pat. No. 7,401,458, FIGS. 1-3 depict an agricultural cutting machine, which is a combine 20 including a header 22. Header 22 is shown supported on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well-known manner, as combine 20 moves forwardly over a field.

The header 22 includes a pan or floor 28 which is supported in desired proximity to the surface of the field during the harvesting operation, and an elongate, sidewardly extending sickle 30 along a forward edge portion 32 of floor 28. The sickle 30 is operable for severing the crop for induction into header 22, as will be explained. Header 22 additionally includes an elongate, sidewardly extending reel 34 disposed above sickle 30 and rotatable in a direction for facilitating induction of the severed crops into header 22. An elongate, rotatable auger 36 (shown in outline form in FIG. 1), which extends in close proximity to a top surface 38 of floor 28 and has helical flights therearound, is operable in cooperation with reel 34 for conveying the severed crops toward an inlet opening of feeder 26 for induction into combine 20, in the well-known manner.

Referring more particularly to FIG. 1, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44. The cutter bar assemblies 44 and 46 are supported in substantially longitudinally aligned relation adjacent to forward edge portion 32 of floor 28.

Referring more particularly to FIGS. 2 and 3, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame member at the bottom of header 22, as also illustrated in FIG. 3. Each of cutter bar assemblies 44 and 46 supports an elongate knife assembly 60 for reciprocating longitudinal movement within slots 48. Each knife assembly 60 includes a row of knife sections 62 including oppositely facing, angularly related knife edges which, in conjunction with adjacent guards 50, effects a shearing or cutting action which severs plant stems and stalks or other material captured between the knives and the guards as the knife sections are reciprocatingly moved sidewardly, as denoted by arrows A.

A sickle drive mechanism 66 includes a first knife head driver element 68 in connection with the knife assembly 60 of first cutter bar assembly 44, and a second knife head driver element 70 in connection with the knife assembly 60 of second cutter bar assembly 46. Knife head driver elements 68 and 70 are simultaneously operable by drive mechanism 66 for reciprocatingly driving the knife head assemblies 60 of respective cutter bar assemblies 44 and 46 sidewardly, as illustrated by arrows A, in timed relation so as to move in opposite sideward directions. That is, as knife head assembly 60 of first cutter bar assembly 44 is moved in one sideward direction, knife head assembly 60 of second cutter bar assembly 46 will be moved in the opposite sideward direction. The length of the sideward movements, or strokes, will be sufficient for providing the desired cutting action, which will typically be equal to about the sideward extent of a knife edge of a typical knife section 62. Further details of the sickle drive mechanism 66 are described in U.S. Pat. No. 7,401,458.

First and second knife head driver elements 68 and 70 are connected to knife assemblies 60 of the respective cutter bar assemblies 44 and 46 using sidewardly extending elongate bars 72 on the forward ends of driver elements 68 and 70, which connect to the knife assemblies 60 with suitable fasteners such as screws 74 or the like. Here, it should be noted that it is desired for the knife head assemblies 60 to move only in the sideward directions relative to stationary bar 52, and not forwardly, rearwardly, upwardly or downwardly to any significant extent relative thereto. This is achieved at least in large part by the containment of knife head assemblies 60 in slots 48 of stationary bar 52, although other constructions for holding the knife head assemblies could be used.

Although reciprocating knife head assemblies 60 are described above, it should be understood that the knife head assemblies 60 may be incorporated onto a chain and moved in a continuous motion, like the blade of a chainsaw, and without departing from the scope or spirit of the invention. A chain sickle cutter that is capable of continuous motion is described in, for example, U.S. Pat. No. 5,732,539, which is incorporated by reference in its entirety and for all purposes.

Figure 4A:
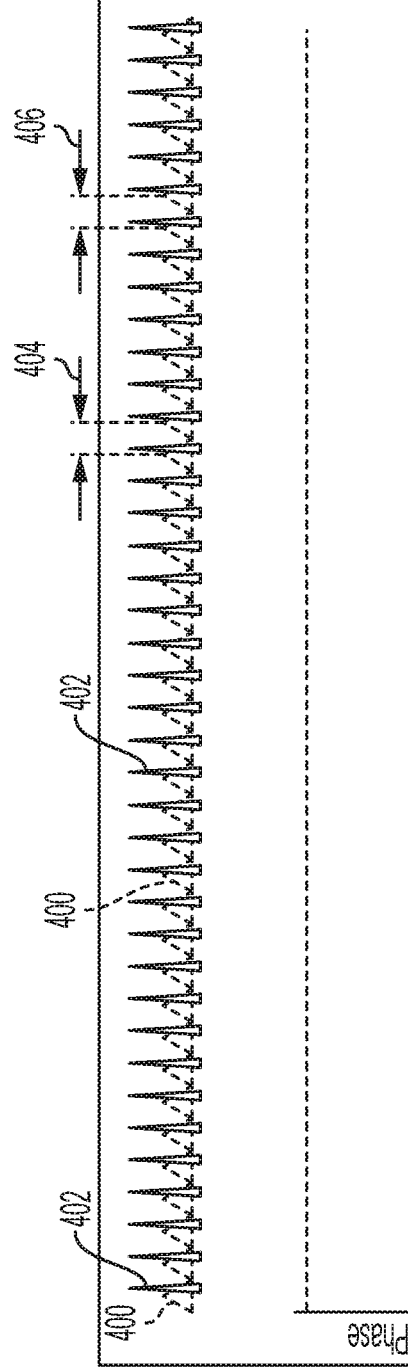
FIG. 4A depicts a schematic block diagram of a cutting system for the header of FIG. 1 having an equal knife and guard pitch.

FIG. 4A depicts a schematic block diagram of a cutting system having an equal knife and guard pitch, like that shown in FIG. 2. The cutting system may be referred to above as a cutter bar assembly. The cutting system shown in FIG. 4A comprises multiple knives 400 that move either over or through guards 402 to shear crop. The phase of the knives 400 (i.e., cutting position) across the cutting system is constant, as shown by the graph located beneath the block diagram of FIG. 4A. The knives 400 move together with respect to the guards 402, which are stationary. According to the arrangement shown in FIG. 4A, there may be at least two knives 400 and two guards 402. The knives 400 may be driven by the same motor (not shown).

Adjacent knives 400 are spaced apart by a uniform distance 406 (also referred to as knife pitch 406), and adjacent guards 402 are spaced apart by a uniform distance 404 (also referred to as guard pitch 404). The distances 404 and 406, which may each be 3 inches, for example, are equal. Thus, the guard pitch 404 is equal to the knife pitch 406. In operation, the guards 402 are all simultaneously impacted by a respective one of the knives 400, resulting in pulse loading. Such a cutting system suffers from the disadvantages described in the Background section. More particularly, simultaneously shearing the crop material at every guard 404 results in pulse loading of the motor/transmission/gear box that moves the cutting system, which causes non-optimal wear and uneven power consumption.

In another embodiment, the guard pitch 404 may be an even multiple of the knife pitch 406. For example, the guard pitch 404 may be twice that of the knife pitch 406. Where the guard pitch 404 is an even multiple (i.e., a whole number multiple) of the knife pitch 406 (e.g., 1×, 2×, 3×, etc.), the guards 404 are all simultaneously impacted by a respective one of the knives 400. Such knife assemblies having a guard pitch 404 that is an even multiple (i.e., a whole number multiple) of the knife pitch 406 also suffer from the disadvantages described in the Background section. Thus, it would be advantageous to avoid pulse loading of the cutting system.

Figure 4B:
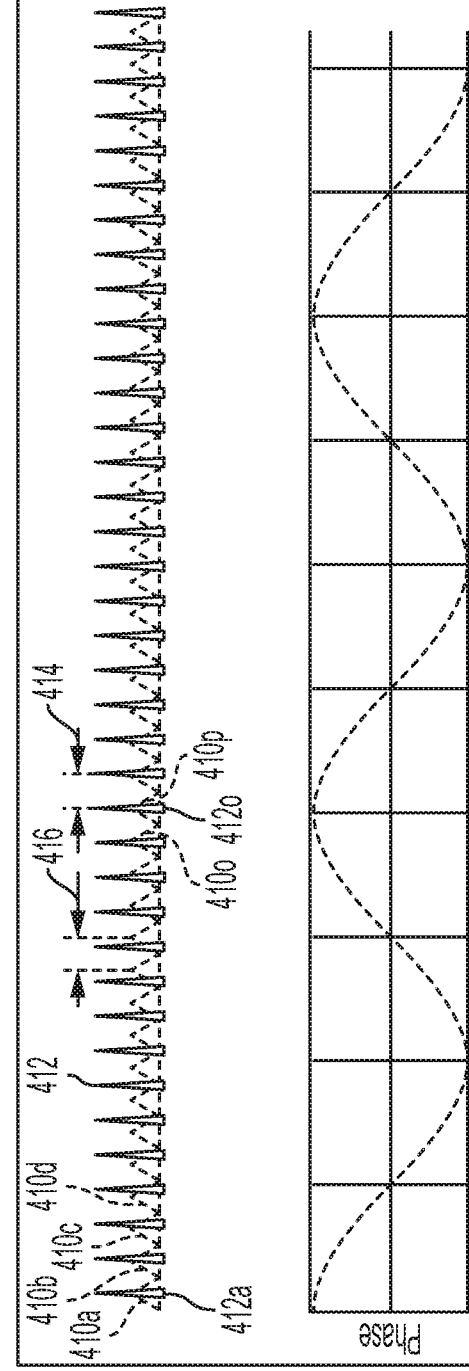
FIG. 4B depicts a schematic block diagram of a different cutting system for the header of FIG. 1 having an unequal knife and guard pitch.

FIG. 4B depicts a block diagram of a cutting system, according to aspects of the invention, having an unequal knife and guard pitch. The cutter bar assembly of FIGS. 1-3 may be replaced with the cutting system of FIG. 4B, for example. Alternatively, the cutting system of FIG. 4B may be incorporated into a continuous/endless cutting system.

Like the cutting system of FIG. 4A, the cutting system shown in FIG. 4B comprises multiple knives 410 that move either over or through guards 412 to shear crop. Adjacent knives 410 are spaced apart by a uniform distance 416 (also referred to as knife pitch 416), and adjacent guards 412 are spaced apart by a uniform distance 414 (also referred to as guard pitch 414).

Unlike the arrangement shown in FIG. 4A, however, the pitches 414 and 416 are not equal and are not whole number multiples of each other. For example, the knife pitch 416 may be 2.95 inches, whereas the guard pitch 414 may be 3 inches. The ratio of the guard pitch 414 to the knife pitch 416 may be 1.016 (i.e., 3.0/2.95), as shown. According to one aspect, the ratio may be greater than (but not equal to) one. According to another aspect, the ratio may be greater than (but not equal to) one and less than (but not equal to) two. According to yet another aspect, the ratio may be any non-whole number.

In operation of the cutting system of FIG. 4B, each of the guards 412 is not simultaneously impacted by a respective one of the knives 410, thereby avoiding the above-described pulse loading problem. The phase of the knives 410 across the cutting system is sinusoidal, as shown by the graph located beneath the block diagram of FIG. 4B.

In a cutting system having a knife pitch 416 of 2.95 inches and a guard pitch 414 of 3.0 inches, the pitch pattern repeats every five feet. Thus, at a position of the cutting system where the knife 410a passes through its respective guard 412a and shears the crop, the next closest knife 410p that also passes through its respective guard 412o and shears crop is spaced apart from the knife 410a by a distance of five feet. The knives 410a and 410p are at the same relative positions (i.e., shearing positions) with respect to their guards 412a and 412o, respectively. The knives therebetween (i.e., knives 410b-410o) are maintained in positions other than the shearing position. As the cutting system continues to be operated, knife 410b shears its crop, then knife 410c shears its crop, then knife 410d shears its crop, etc. Accordingly, the crop shearing load is spread out over the full stroke of the gear box resulting in more optimal wear of the gear box and even power consumption.

By way of non-limiting example, the cutting system of FIG. 4B may include at least two knives 410 and two guards 412, or at least five knives 410 and five guards 412, or at least ten knives 410 and ten guards 412, or at least fifty knives 410 and fifty guards 412. The knives 410 may be driven by the same motor (not shown), or, alternatively, the knives 410 may be driven by the different motors.

The knife assemblies that are shown in FIGS. 4A and 4B may either reciprocate or move in a continuous fashion, as was described above.

In light of all the foregoing, it should thus be apparent to those skilled in the art that there has been shown and described a cutting system of an agricultural cutting machine. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A cutting system for a header of an agricultural machine, said cutting system comprising:
   a knife guard comprising a plurality of guards that are spaced apart by a guard pitch;
   a knife section that is configured to move with respect to the knife guard for cutting crop material, said knife section comprising a plurality of knives that are spaced apart by a knife pitch,
   wherein the guard pitch is neither equal to nor is a whole number multiple of the knife pitch, and wherein a ratio of the guard pitch to the knife pitch is greater than one and less than two,
   wherein, the plurality of knives are arranged side by side in a transverse direction, and, the knife pitch and the guard pitch are defined such that, in operation of the cutting system, exactly and only two guards of the plurality of guards are impacted by respective knives at any one time as viewed over a distance of 5 feet along the transverse direction.

2. The cutting system of claim 1, wherein each knife has a sharp cutting edge.

3. The cutting system of claim 1, further comprising a frame to which the knife guard is connected, the frame forming part of the header.

4. The cutting system of claim 3, wherein the guards each extend past the knives, as viewed in a forward direction of travel of the agricultural machine, such that the guards contact the crop material before the knives.

5. The cutting system of claim 3, wherein the guards are stationary with respect to the frame and the knives move with respect to the frame.

6. The cutting system of claim 1, further comprising a motor for moving the knives relative to the guards, and each of the knives is connected to an output shaft of the motor.

7. The cutting system of claim 6, wherein the motor is configured to move the knives in either a reciprocating fashion or a continuous and endless fashion.

8. The cutting system of claim 1, wherein the knives are connected together such that the knives simultaneously move together in the same direction.

9. The cutting system of claim 1, wherein for a predetermined distance, a number of knives over that distance is greater than a number of guards over that distance.

10. The cutting system of claim 1, wherein the guards are uniformly spaced apart and the guard pitch is uniform for the guards.

11. The cutting system of claim 1, wherein the knives are uniformly spaced apart and the knife pitch is uniform for the knives.

12. The cutting system of claim 1, wherein each guard includes a slot through which the knife section passes.

13. A header for a combine comprising the cutting system of claim 1.

14. A combine comprising the header of claim 13.

15. The cutting system of claim 1, wherein the knife pitch is 2.95 inches and the guard pitch is 3.0 inches.

16. The cutting system of claim 1, wherein the knife pitch and the guard pitch are defined such that, in operation of the cutting system, exactly and only two knives are in a shearing position relative to their respective guards at any one time as viewed over the distance of 5 feet along the transverse direction.

* * * * *